United States Patent [19]

Burgess

[11] Patent Number: 4,834,128

[45] Date of Patent: May 30, 1989

[54] AUTOMOBILE COVER DEVICE

[76] Inventor: Joseph M. Burgess, 2450 Plaster Ave., Atlanta, Ga. 30305

[21] Appl. No.: 92,388

[22] Filed: Sep. 2, 1987

[51] Int. Cl.$^4$ .............................................. E04H 15/06
[52] U.S. Cl. ...................................... 135/88; 135/117; 135/903
[58] Field of Search ................... 135/88, 89, 903, 904, 135/117, 115; 296/136

[56] References Cited

U.S. PATENT DOCUMENTS

| | | | |
|---|---|---|---|
| 789,982 | 5/1905 | Lockett | 135/904 |
| 1,106,624 | 8/1914 | Cadwallader | 135/903 |
| 1,279,596 | 9/1918 | Sharbondy | 135/903 |
| 2,097,923 | 11/1937 | Hutchinson | 135/88 |
| 2,995,137 | 8/1961 | Cothern | 135/88 |
| 3,009,166 | 11/1961 | Sears | 135/903 |
| 4,487,212 | 12/1984 | Moore | 135/88 |
| 4,605,030 | 8/1986 | Johnson | 135/89 |
| 4,655,236 | 4/1987 | Doramé et al. | 135/88 |

FOREIGN PATENT DOCUMENTS 6708080 12/1968 Netherlands ......................... 135/903

Primary Examiner—David A. Scherbel
Assistant Examiner—Caroline D. Dennison
Attorney, Agent, or Firm—Thomas & Kennedy

[57] ABSTRACT

A device for use in covering an automobile comprises a base frame upon which the front or rear tires of an automobile may be received. A spindle is supported above the base frame to which a flexible automobile cover is mounted. Two rollers are mounted adjacent the spindle through which the cover may be guided, pulled over an automobile with its front or rear tires positioned on the base frame and attached to the end of the automobile located beyond the device.

4 Claims, 7 Drawing Sheets

AUTOMOBILE COVER DEVICE

BACKGROUND OF THE INVENTION

Protecting automobiles from the elements which damage exterior finishes and interior components has always been desirable. The ideal solution is a building such as garage or carport devoted exclusively to the protection of the vehicle. The ideal solution, however, is not always available to everyone.

There have been various remedies offered by inventors. Most employ some type of fabric or plastic cover flexible enough to be rolled up or folded when not in use. This flexible cover is sometimes used in conjunction with some type of adjustable or semi-rigid framework.

Examples include the "Portable Erectile Vehicle Shelter Structure" disclosed by Jefrey K. Johnson in U.S. Pat. No. 4,605,030; the "Vehicle Covering Apparatus" disclosed by James R. McAndrew in U.S. Pat. No. 4,164,233; and the "Vehicle Cover Assembly" disclosed by Joseph S. Mathis in U.S. Pat. No. 4,174,134.

Other proposed remedies utilizing flexible covers include the "Combination Bumper, Container, Tent and Car Cover" disclosed by J. H. Herzer in U.S. Pat. No. 1,719,055; the "Automobile Cover" disclosed by E. Wandscheer in U.S. Pat. No. 1,912,231; the One Man Automobile Cover" disclosed by D. F. Pinkerton in U.S. Pat. No. 2,751,977; and the "Automobile Bumper with Adiabatic Device" disclosed by Huang et al in U.S. Pat. No. 4,324,427.

All of these inventions are designed to be attached to or carried in the automobile itself and as such are deemed portable. None of the aforementioned devices seems to have met with commercial success. Simple tarpaulins or relatively form fitting lightweight fabric covers are used alone as often as anything to substitute for garages or carports. These loose flexible covers can be bulky, difficult for one person to handle, easily stolen and are likely to soil ones clothing when being handled.

Accordingly, a reasonably easy to use device that is not time consuming, easily stolen or attached permanently to a vehicle is still needed by the car owner who does not have a garage or carport.

BRIEF DESCRIPTION OF THE PRESENT INVENTION

The present invention consists of a horizontal frame maintaining contact with the ground, providing a resting place for the front or rear wheels, but preferably the front, of a car lending a base for two permanently attached spindle supports.

Mounted through and extending between the said spindle supports, approximately parallel to the bumper of a car when the device is in use, are two cover guide rollers and one cover spindle upon which a flexible car cover of various proportions may be attached. At one end of the cover spindle are attached a turning handle and a ratchet type gear. The attached cover is fed between the guide rollers and may, by means of the turning handle, be wound upon the cover spindle when not covering a vehicle.

The user of the present invention may, by means of the ratchet, govern the amount of cover extended from the cover spindle. Thus allowing one cover size to be snugly attached to various lenghts of automobiles.

It is an object of the present invention to provide an economically feasible alternative to a garage or carport.

Another object of the present invention is to provide a convenient method of storing and using a flexible automobile cover.

Another object of the invention is to provide a framework for handling flexible car covers that will accomodate without adjustment vehicles of various wheel bases and track widths.

Still another object of the present invention is to provide a device to facilitate handling and storing flexible car covers that, with cover extended over an automobile, is firmly anchored to the ground and capable of withstanding relatively high winds.

Yet another object of the present invention is to provide a device for handling and storing flexible car covers that, with the cover not extended and no car present, is capable of withstanding relatively high winds.

These and other objectives will become apparent to one skilled in the art through careful examination of the information contained herein.

DETAILED DESCRIPTION OF THE ILLUSTRATED EMBODIMENT

Figure 1:
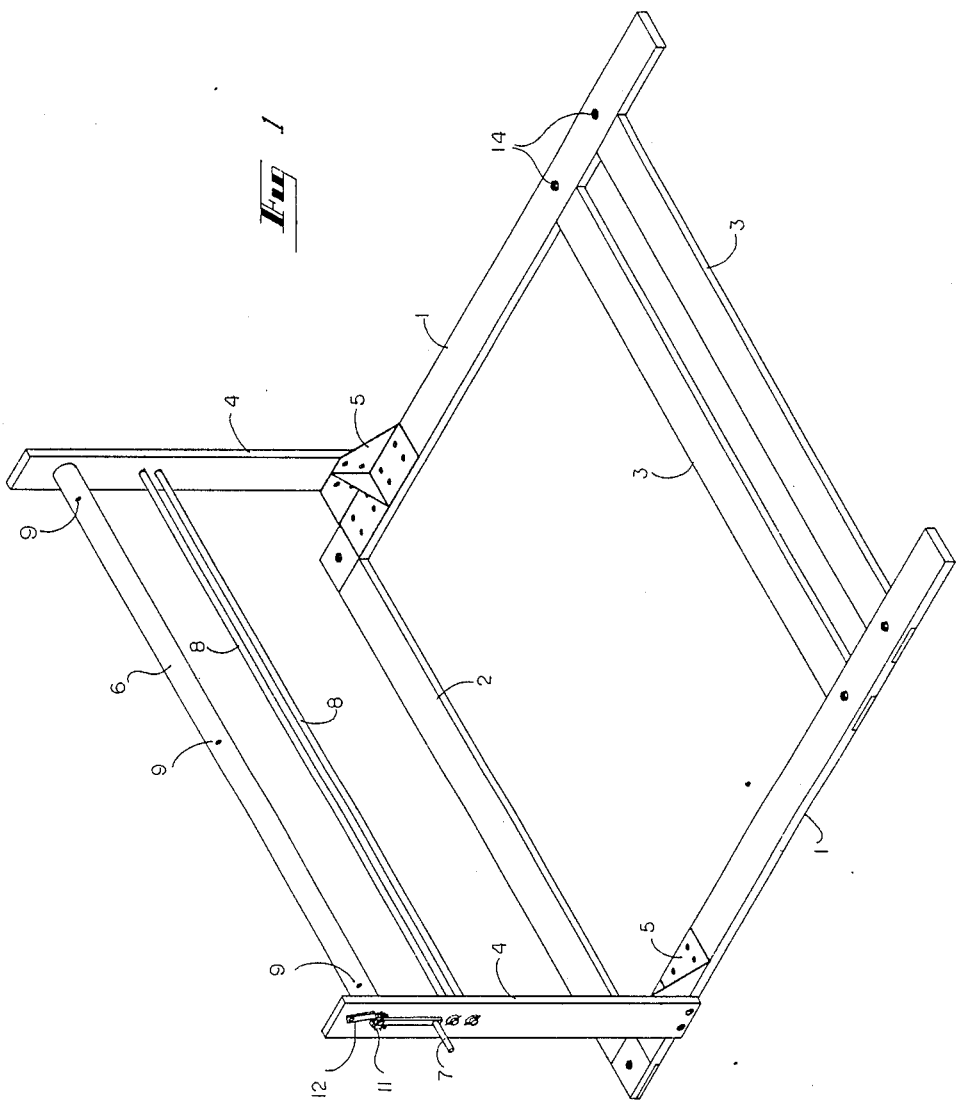
FIG. 1 is an isometric view of the present invention without a vehicle present and no cover attached.
Figure 7:
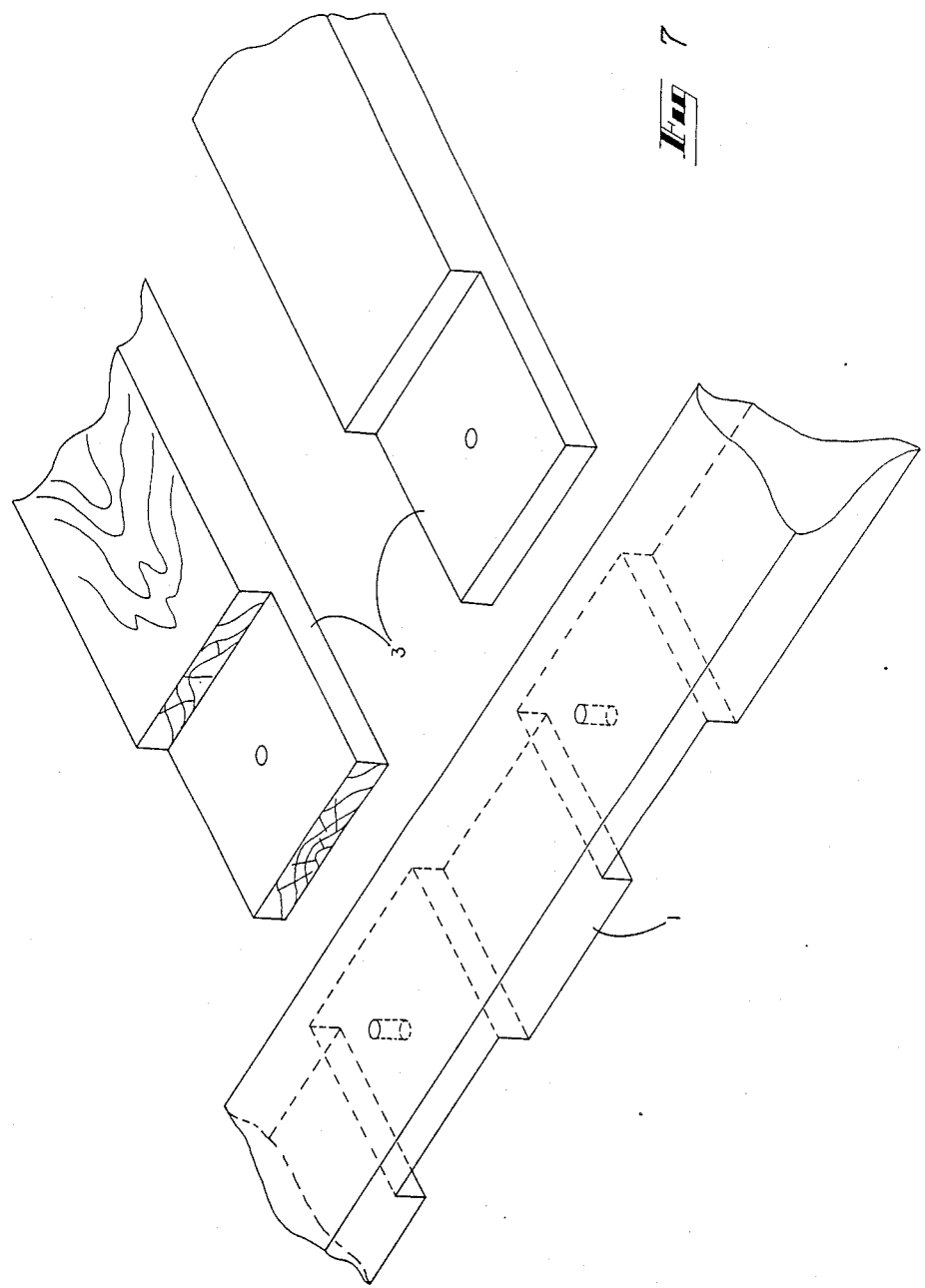
FIG. 7 is and exploded detailed isometric view of the left ends of the two rear transverse frame members and the portion of the left side longitudinal frame member where they attach.

Referring to the accompanying drawings by reference numbers, FIG. 1 shows a device for the handling and storing of a flexible automobile cover. Number 1 of FIG. 1 being a longitudinal horizontal frame member to which are attached, by through bolts 14, front transverse frame member 2 and rear transverse frame members 3. Horizontal frame members 1,2 and 3 being notched where joined to effect flush surfaces top and bottom and drilled to receive through bolts 14 as seen in FIG. 7.

Referring again to FIG. 1, longitudinal frame members 1 are attached to vertical spindle supports 4 and rigidifying this attachment are vertical support brackets 5 and screws 19.

Figure 4:
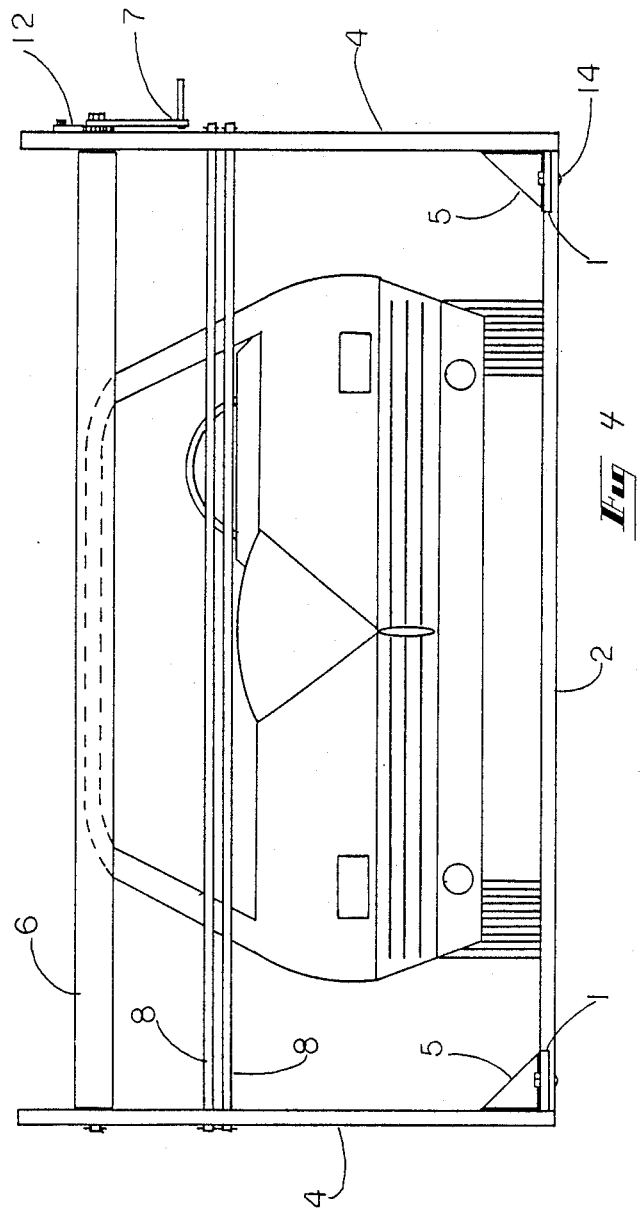
FIG. 4 is a front elevation of the present invention with a vehicle in place and no cover attached.

Referring to FIG. 4, the two cover guide rollers 8 and cover spindle 6 can be seen extending through and between vertical spindle supports 4.

Figure 5:
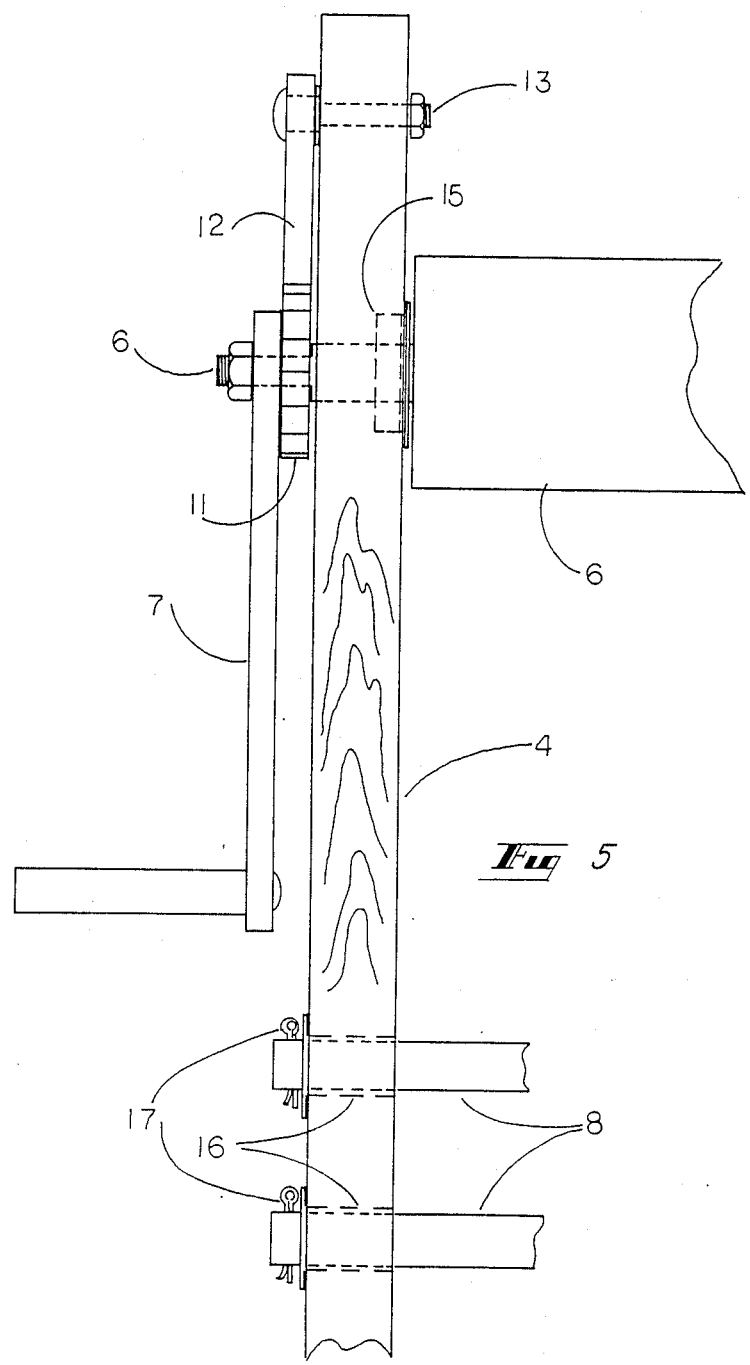
FIG. 5 is a rear detailed elevation of the upper portion of the left vertical spindle support.

Referring now to FIG. 5, cover guide rollers 8 can be seen extending through vertical spindle supports 4 and flanged bushings 16. Removal being prevented by cotter pins 17.

Referring still to FIG. 5, cover roller 6 can be seen extending through vertical spindle support 4 and bearing 15. Mounted on the twice diametrically reduced end of cover spindle 6 are ratchet gear 11 and turning handle 7.

Figure 6:
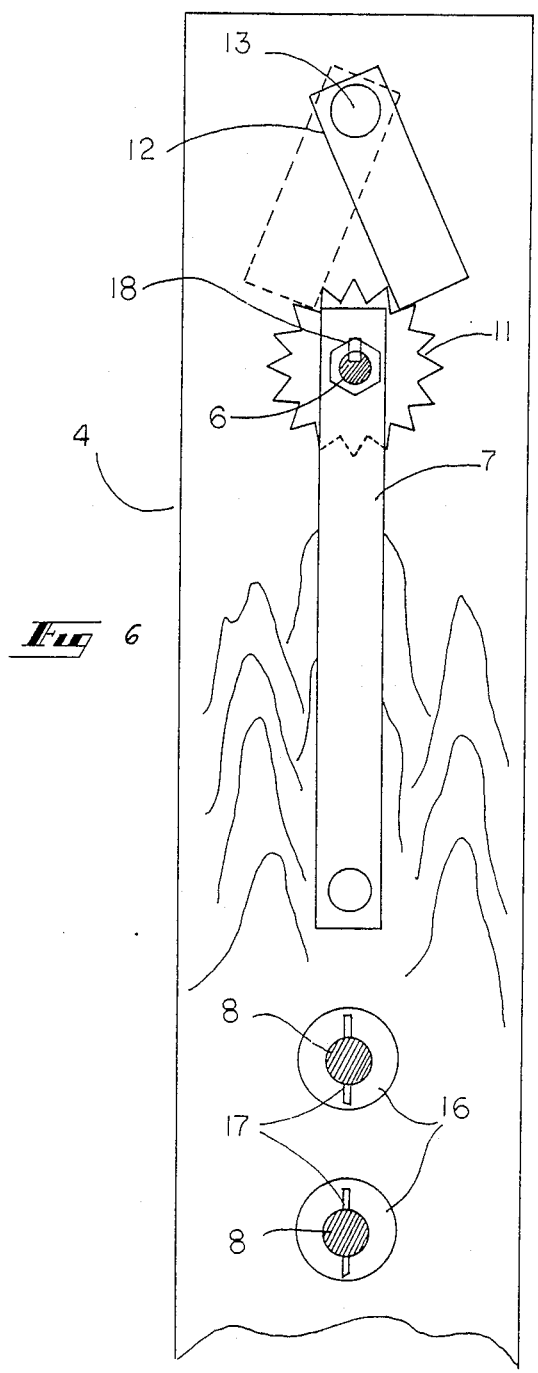
FIG. 6 is a left side detailed elevation of the upper portion of the left vertical spindle support.

Referring now to FIG. 6, ratchet gear 11 and turning handle 7 can be seen engaged rotationally to the end of cover spindle 6 by means of key 18. Removal of turning handle 7 and ratchet gear 11 is prevented by hex nut 21.

Referring to FIG. 6 again, pawl 12 can be seen in either of two possible positions. Pivotally mounted on pawl bolt 13. Pawl 12 is kept engaged to ratchet gear 11 by the force of gravity.

In the preferred embodiment, the user of the present invention would decide the most desirable method of attaching the flexible cover to the rear of his or her vehicle. A cover designed to fit the shape of the rear end of a particular model would in itself effect a reliable attachment system. A Velcro hooks and loops type of fastener could be employed with the relatively stiff hooks part being glued or otherwise made fast to the underside of the car's bumper and the soft loops part being sewn onto the leading edge of the cover.

Many methods of attaching the cover to the vehicle are available and the design of a particular model may affect the user's choice. The method described herein is for illustrative purposes only.

Figure 3:
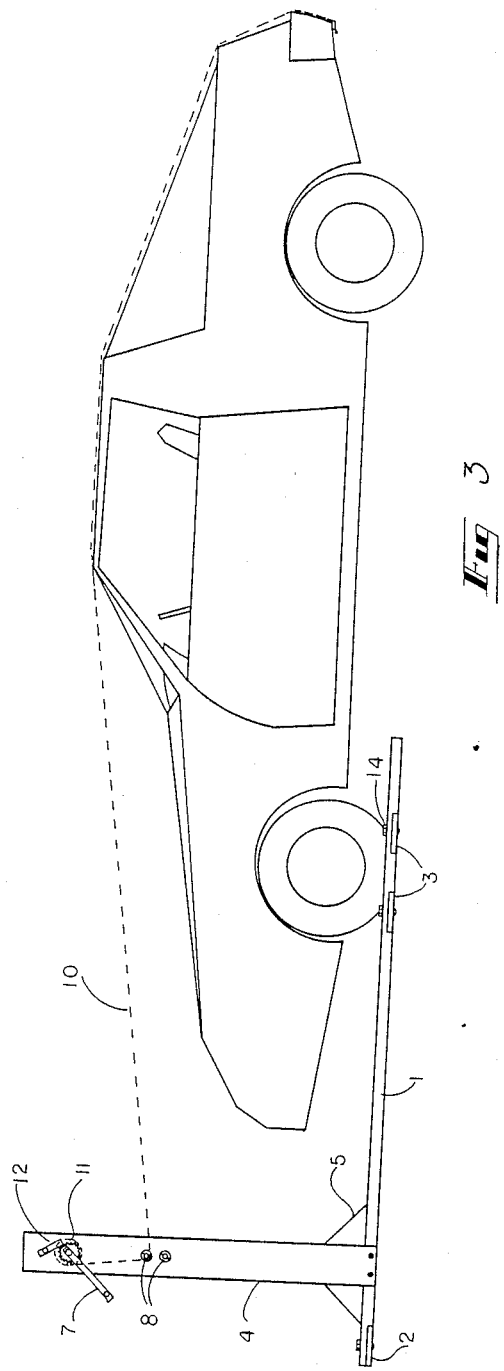
FIG. 3 is a left side elevation showing a vehicle in place, a ghosted in cover properly routed and attached to the rear bumper of a car by small hooks.

Referring to FIG. 3, a ghosted in simple rectangular cover 10 is shown extending down from the cover spindle 6 thence between cover guide rollers 8 outward and over the top of a car 50, ending at a small hook 51 attached to the rear bumper of the car 50.

Figure 2:
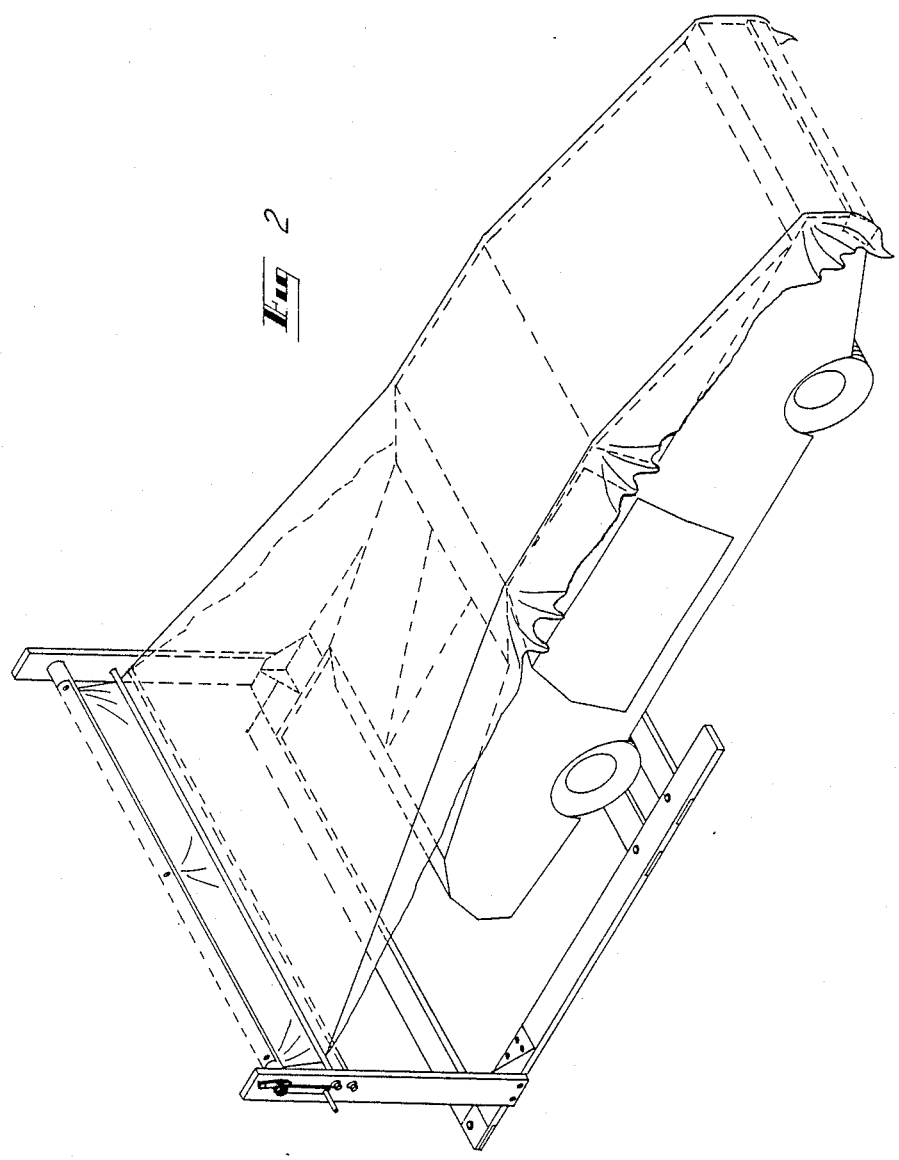
FIG. 2 is an isometric view showing the present invention with a cover attached and extended over an automobile.

Referring to FIG. 2. Ideally a user of the present invention, after attaching one end of the flexible cover to cover spindle 6 by means of cover attachment screws 9, would wind the cover 10 upon the cover spindle 6 by means of turning hnadle 7 while feeding the cover 10 through cover guide rollers 8 until only a short length of the cover 10 extended from between the cover guide rollers 8. At this point the present invention would be ready to receive a vehicle 50.

Referring to FIG. 3. After positioning the vehicle 50 longitudinally and laterally as shown in FIG. 4, the user of the present invention would be ready to cover the car.

Referring back to FIG. 3, the user would position pawl 12 so that by grasping a corner of cover 10 and walking toward the rear of the car 50, the cover spindle 6 would be free to rotate allowing the cover 10 to be pulled over the car 50 and attached to said car in whatever manner the user of the present invention had previously prepared for.

Referring again to FIG. 3. Removing the cover 10 from car 50 is accomplished first by detaching the cover from the rear of the car 50. Then, reversing position of pawl 12 allowing turning handle 7 to be turned, thereby rotating cover spindle 6 and retracting extended cover 10. With cover 10 sufficiently retracted and now rewound upon cover spindle 6, the vehicle 50 is free to be moved and the present invention is prepared for its next use.

Thus, there has been shown a novel device for handling and storing a variety of shapes and sizes of flexible automobile covers which fulfills all sought after objects and advantages stated herein. All modifications, other uses and alterations not departing from the scope and spirit of the present invention are considered to be covered by this invention and limited only by the following claims.

What I claim is:

1. A mobile, stand-alone device for use in covering an automobile and which comprises a base frame configured to be set flatly upon the surface of a roadway and having tires support means for supporting the front pair or rear pair of tires of an automobile driven at least partially thereon; a spindle support mounted uprightly upon said base frame; a spindle rotatably mounted to said spindle support supported above said base frame at a distance from said tires support means sufficient for the end of the automobile adjacent the supported wheels to reside between said spindle and said tire support means with the automobile front or rear tires supported on said wheel support means; and a flexible cover mounted about said spindle with a free end thereof bearing means for releasible attachment to the other end of the automobile that resides beyond said tires support means, whereby the device may be positioned at a desired location upon a roadway and automobile driven onto the base frame and parked with a pair of its tires supported on the base frame tires support means thereby holding the mobile, standalone device firmly in place at the desired location and covered with the flexible cover.

2. The device of claim 1 further comprising a pair of guide rollers mounted adjacent said spindle through which said flexible cover extends.

3. The device of claim 1 further comprising means for hand cranking said spindle.

4. The device of claim 1 wherein said base frame includes a pair of side members that define the sides of said base, and wherein said base frame tires support means comprises a pair of mutually spaced transverse members that extend between said base side members to support tires of different spacings.

* * * * *